United States Patent
Faizan et al.

(10) Patent No.: US 11,753,804 B2
(45) Date of Patent: Sep. 12, 2023

(54) FLUID FLOW CONTROL UNIT

(71) Applicants: Ayat Faizan, Irving, TX (US); Mirza Faizan, Irving, TX (US)

(72) Inventors: Ayat Faizan, Irving, TX (US); Mirza Faizan, Irving, TX (US)

(*) Notice: Subject to any disclaimer, the term of this patent is extended or adjusted under 35 U.S.C. 154(b) by 220 days.

(21) Appl. No.: 17/391,000

(22) Filed: Aug. 1, 2021

(65) Prior Publication Data
US 2023/0034830 A1     Feb. 2, 2023

(51) Int. Cl.
*E03C 1/04* (2006.01)

(52) U.S. Cl.
CPC .................. *E03C 1/0412* (2013.01)

(58) Field of Classification Search
CPC ................................. E03C 1/0412
USPC ............................ 4/678, 661, 902
See application file for complete search history.

(56) References Cited

U.S. PATENT DOCUMENTS

| | | | | |
|---|---|---|---|---|
| 2,548,933 A | * | 4/1951 | Barnett | E03C 1/04 |
| | | | | D23/255 |
| 4,353,139 A | * | 10/1982 | Wainwright | A47K 3/001 |
| | | | | 4/661 |
| 6,138,292 A | * | 10/2000 | O'Toole | A47K 13/24 |
| | | | | 4/405 |
| 9,909,685 B1 | * | 3/2018 | Flores | F16K 35/00 |
| 2013/0283962 A1 | * | 10/2013 | Lee | E03C 1/0412 |
| | | | | 74/523 |
| 2023/0030828 A1 | * | 2/2023 | Vetter | E03C 1/0412 |

* cited by examiner

*Primary Examiner* — Tuan N Nguyen

(57) ABSTRACT

A fluid flow control unit adapted to control flow of fluid from a tap is disclosed. The fluid flow control unit comprises a vertical piece (101) extending along the length of the tap; and a horizontal piece (102) extending along a handle of the tap, wherein the vertical piece (101) and the horizontal piece (102) are sheet structures attached together at a predetermined angle, wherein one of sides (101*a*) of the vertical piece (101) is attached to one of sides (102*a*) of horizontal piece, and wherein a point of attachment of the vertical piece (101) and the horizontal piece is above the handle (105) of the tap.

10 Claims, 1 Drawing Sheet

FLUID FLOW CONTROL UNIT

FIELD OF THE INVENTION

The present invention relates to a fluid flow control unit for tap, and particularly, a fluid flow control unit adapted to control the flow of fluid dispensing from the tap.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Water covers 70% of our planet, and it is easy to think that it will always be plentiful. However, freshwater—the stuff we drink, bathe in, irrigate our farm fields with—is incredibly rare. Only 3% of the world's water is fresh water, and two-thirds of that is tucked away in frozen glaciers or otherwise unavailable for our use.

As a result, some 1.1 billion people worldwide lack access to water, and a total of 2.7 billion find water scarce for at least one month of the year. Inadequate sanitation is also a problem for 2.4 billion people—they are exposed to diseases, such as cholera and typhoid fever, and other waterborne illnesses. Two million people, mostly children, die each year from diarrheal diseases alone.

Many of the water systems that keep ecosystems thriving and feed a growing human population have become stressed. Rivers, lakes and aquifers are drying up or becoming too polluted to use. More than half the world's wetlands have disappeared. Agriculture consumes more water than any other source and wastes much of that through inefficiencies. Climate change is altering patterns of weather and water around the world, causing shortages and droughts in some areas and floods in others.

At the current consumption rate, this situation will only get worse. By 2025, two-thirds of the world's population may face water shortages. And ecosystems around the world will suffer even more.

Low-tech technologies used to collect water in arid regions include: 1) fine mesh "fog catching" nets stretched between poles that collect usable water from fog; 2) "rooftop harvesting" using pipes that divert rain from rooftops into a cistern; and 3) desalination cones placed in saltwater. With the latter sun evaporates water, which condenses on the cones inner wall and trickles down into collection areas around the bottom edges.

Water can be conserved by repairing leaky pipes, and turning taps off when not required. Typically, commercial and domestic premises have a water supply installation that includes a number of water outlets all fed through a network of pipes from a pressurised mains supply. Each outlet has some form of control, for example, a manually operated tap or stopcock, or an automatic valve such as may be found in an appliance for example, a washing machine.

While the premises are in routine occupation, it is normal that the entire water supply system remains under pressure continuously. This means that all of the outlets and all of the pipes must remain entirely watertight, otherwise a leak will occur.

Wastage of water in a water supply installation occur mainly due to usage practices. For example, an improperly operated tap, i.e., setting the tap to maximum flow even when less water is required.

The conventional technology available in the art includes a tap with two or more flow control settings. In one of the settings, the tap is set to allow a predetermined minimum flow of water while another settings may allow water flow more than the minimum water flow.

However, in the conventional installation, there remains a problem of wastage of water. There may be a situation that the user does not know the tap settings, for example, a child using the tap may not be able to operate it correctly and as per the requirement of water flow.

Therefore, there arises a need to provide a water flow control unit or a fluid flow control unit for tap that may be adapted to control the flow of fluid being dispensed from the tap.

OBJECTIVE OF THE INVENTION

The present disclosure is aimed at providing a control unit adapted to control the flow of fluid from a tap.

Another object of the present invention is to provide a fluid flow control unit adapted to allow the user to change the rate of fluid flow from the tap.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

According to an embodiment of the present disclosure, a fluid flow control unit adapted to control flow of fluid from a tap comprises a vertical piece extending along the length of the tap; and a horizontal piece extending along a handle of the tap, wherein the vertical piece and the horizontal piece are sheet structures attached together at a predetermined angle, wherein one of sides of the vertical piece is attached to one of sides of horizontal piece, and wherein a point of attachment of the vertical piece and the horizontal piece is above the handle of the tap.

According to an embodiment, the fluid flow control unit is made of plastic material.

According to an embodiment, the vertical piece comprises one or more gripping unit to allow the vertical unit to rest on the tap.

According to an embodiment, the gripping unit is made of plastic material.

According to an embodiment, the gripping unit comprises two extended pieces adapted to surround the length of the tap.

According to an embodiment, the two extended pieces of the gripping unit are adapted to adjust distance between themselves according to size and/or type of the tap.

According to an embodiment, the angle of attachment of the vertical piece and the horizontal piece is variable.

According to an embodiment, the angle of attachment of the vertical piece and the horizontal piece is varied by changing the position of the horizontal piece.

According to an embodiment, the handle of the tap is movable up to level of the horizontal sheet, and wherein the predetermined angle between the vertical piece and the horizontal piece is associated with a predetermined rate of fluid flow.

According to an embodiment of the present invention, a fluid flow dispensing unit for dispensing a controlled rate of fluid comprises a tap dispensing the fluid and a fluid flow control unit attached to the tap.

BRIEF DESCRIPTION OF DRAWINGS

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

Figure 1:
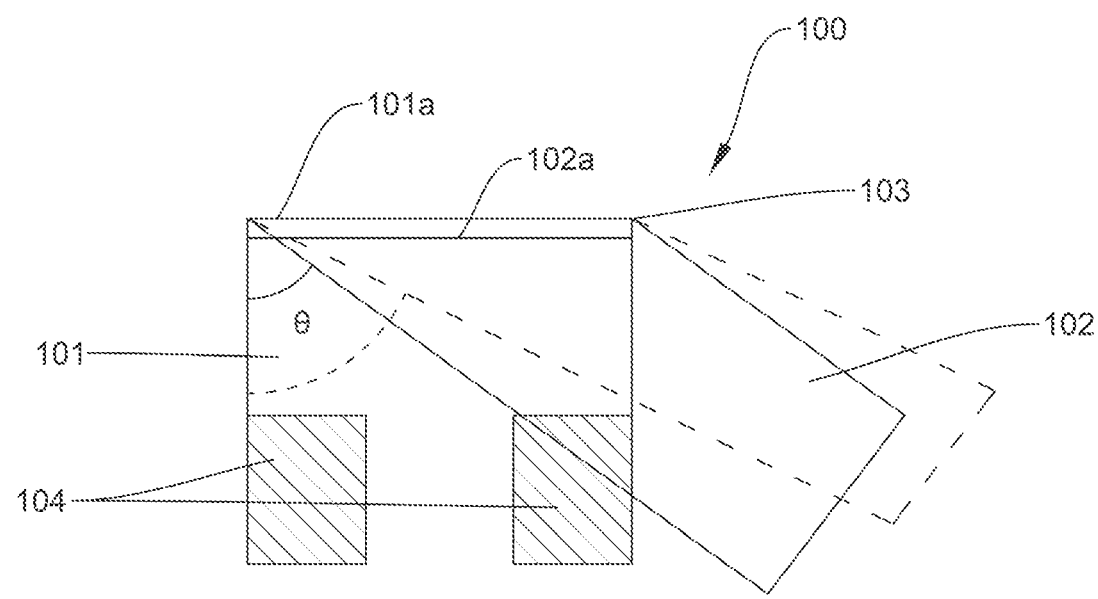
FIG. 1 illustrates a structure of a fluid control unit, according to an embodiment of the invention.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below. Embodiments of the present invention will be described below in detail with reference to the accompanying drawings.

Figure 2:
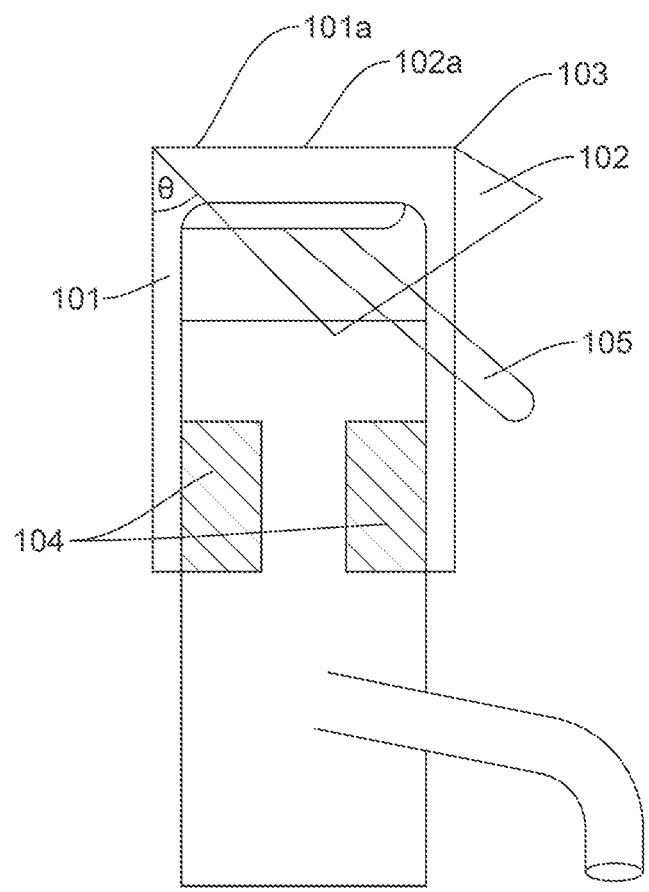
FIG. 2 illustrates a fluid flow dispensing unit comprising a fluid control unit, according to an embodiment of the invention.

The present invention provides a fluid flow control unit 100 (hereinafter referred to as "control unit" 100) for controlling the flow of fluid from a tap. FIG. 1 illustrates structure of the fluid flow control unit 100, according to an embodiment of the present invention. FIG. 2 illustrates a fluid flow dispensing unit comprising a fluid control unit 100, according to an embodiment of the invention.

The control unit 100 may comprise a vertical piece 101 extending along the length of the tap. The vertical piece 101 may be a sheet of plastic adapted to run longitudinally along the tap body. Further, a horizontal piece 102 may be placed extending horizontally along handle 105 (as shown in FIG. 2) of the tap. In an embodiment, the vertical piece 101 and the horizontal piece 102 may be sheet structures attached together at a predetermined angle.

In an embodiment, the vertical piece 101 may be a square or a rectangular sheet of plastic. The plastic composition of the sheet may allow the vertical piece 101 to get curved and surround the tap body while the horizontal piece 102 be a sturdy sheet placed horizontally. One of sides 101a of the vertical piece 101 may be attached to one of sides 102a of horizontal piece 102. The sheets may be attached together at a point of attachment. In an embodiment, the point of attachment may be above the surface of the handle 105 (shown in FIG. 2) of the tap. Therefore, there may be an inverted L-shaped structure above the tap.

In an embodiment, the vertical piece 101 may comprise one or more gripping unit to allow the vertical piece 101 to rest on the tap. The gripping unit may be required to prevent the vertical piece 101 and eventually the control unit 100 from slipping off the tap body.

In an embodiment, the gripping unit is made of plastic material. In another embodiment, the gripping unit may be made of other suitable material adapted to allow repositioning and flexibility to the gripping unit in order to allow gripping of the control unit 100 to more than one kind of tap.

In an embodiment, the gripping unit may comprise at least two extended pieces 104 adapted to surround the length of the tap.

Referring to FIG. 2, each of the extended pieces 104 may be at the bottom of the vertical piece 101, and particularly, at two ends or edges at the bottom of the vertical piece 101. The extended pieces 104 may be adapted to surround the longitudinal body of the tap and gets themselves adjusted so as to grip the tap body. The extended pieces 104 may be adapted to create such a contact with the tap body so as to make the vertical piece 101 attached to the tap body without letting it to slip off. In an embodiment, the contact between the vertical piece 101 and the tap body may be made by the two extended pieces 104 adjusting distance between themselves according to size and/or type of the tap. In an exemplary embodiment, the tap body may be circular with a diameter of around 2 inches, while in another embodiment, the diameter of the tap body may be around 4 inches. The extended pieces 104 may be adapted to increase the distance between themselves to adjust on the tap having 4 inches diameter body and the same extended pieces 104 may be adapted to decrease the distance between themselves to adjust on the tap having 2 inches diameter body, without being damaged.

Further referring to FIG. 1, the angle of attachment θ of the vertical piece 101 and the horizontal piece 102 may be variable. The angle of attachment θ may be varied manually by the user in an embodiment. The user may increase the angle of attachment θ by the stretching out the horizontal piece 102 along the attachment line 103. The user may decrease the angle of attachment θ of the vertical piece 101 and the horizontal piece 102 by stretching in the horizontal piece 102 towards the attachment line 103.

In an embodiment, the handle 105 of the tap is movable up to level of the horizontal piece 102. Therefore, the greater the angle of attachment θ, the more the handle 105 may be slided over. In other words, the handle 105 may be movable in the upward direction more, if the angle of attachment θ is more.

Further, the predetermined angle between the vertical piece 101 and the horizontal piece 102 is associated with a predetermined rate of fluid flow. In an exemplary embodiment, if the angle of attachment θ is 60 degrees, the tap handle 105 may move up to a certain level and let x rate of fluid to flow through the tap. In another exemplary embodiment, if the angle of attachment θ is 30 degrees, the tap handle 105 may move up to a certain level and let y rate of fluid to flow through the tap, wherein x may be greater than y. Therefore, by changing the angle of attachment θ, the flow rate of fluid dispensing from the tap may be changed.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

We claim:

1. A fluid flow control unit (100) adapted to control flow of fluid from a tap, the fluid flow control unit (100) comprising:
    a vertical piece (101) extending along the length of the tap; and
    a horizontal piece (102) extending along a handle (105) of the tap,
    wherein the vertical piece (101) and the horizontal piece (102) are sheet structures attached together at a predetermined angle,
    wherein one of sides (101a) of the vertical piece (101) is attached to one of sides (102a) of horizontal piece (102), and
    wherein a point of attachment of the vertical piece (101) and the horizontal piece (102) is above the handle (105) of the tap.

2. The fluid flow control unit (100) as claimed in claim 1, wherein the fluid flow control unit (100) is made of plastic material.

3. The fluid flow control unit (100) as claimed in claim 1, wherein the vertical piece (101) comprises one or more gripping unit to allow the vertical piece (101) to rest on the tap.

4. The fluid flow control unit (100) as claimed in claim 3, wherein the gripping unit is made of plastic material.

5. The fluid flow control unit (100) as claimed in claim 3, wherein the gripping unit comprises two extended pieces (104) adapted to surround the length of the tap.

6. The fluid flow control unit (100) as claimed in claim 1, wherein the two extended pieces (104) of the gripping unit are adapted to adjust distance between themselves according to size and/or type of the tap.

7. The fluid flow control unit (100) as claimed in claim 1, wherein the angle of attachment (θ) of the vertical piece (101) and the horizontal piece (102) is variable.

8. The fluid flow control unit (100) as claimed in claim 7, wherein the angle of attachment (8) of the vertical piece (101) and the horizontal piece (102) is varied by changing the position of the horizontal piece (102).

9. The fluid flow control unit (100) as claimed in claim 1, wherein the handle (105) of the tap is movable up to level of the horizontal piece (102), and wherein the predetermined angle between the vertical piece (101) and the horizontal piece (102) is associated with a predetermined rate of fluid flow.

10. A fluid flow dispensing unit for dispensing a controlled rate of fluid, wherein the fluid flow dispensing unit comprises a tap dispensing the fluid and the fluid flow control unit (100) as claimed in claim 1 attached to the tap.

\* \* \* \* \*